United States Patent Office 3,222,398
Patented Dec. 7, 1965

3,222,398
HEPTYLOXYPHENYL BIGUANIDE COMPOUNDS
Joseph Patrick Brown, Bryn Castell, Geufron, Llangollen, Wales, assignor to Monsanto Chemicals Limited, London, England, a British company
No Drawing. Filed Mar. 6, 1963, Ser. No. 263,108
4 Claims. (Cl. 260—565)

This invention relates to mycobacteriostatic compounds, that is to say compounds having both bacteriostatic and fungistatic activity, certain of which are new compounds.

In recent years, an intensive search has been made for compounds possessing mycobacteriostatic activity, particularly compounds which are effective against a wide range of bacteria and fungi. It has now been discovered that certain aromatic biguanides and their salts, some of which are new, possess this broad spectrum of activity to a high degree.

The mycobacteriostats of the invention are compounds having linked to a nitrogen atom of a biguanide either an aliphatic-oxyaryl group containing a halogen atom or an aliphatic-oxyaryl group in which the aliphatic substituent is a hydrocarbon substituent containing from 5 to 9 carbon atoms, or a salt of such a compound, and the invention accordingly includes the use of such compounds and salts for inhibiting the growth of bacteria or fungi.

The invention also comprises a mycobacteriostatic composition containing such a compound (or salt) as an active ingredient in admixture with an inert diluent.

In general, the mycobacteriostatic composition of the invention is often a suspension, emulsion or solid which comprises an inert diluent and an aromatic biguanide (or its salt) as defined above. Preferably a suspension or emulsion is an aqueous one.

A specific class of active ingredients are biguanides and biguanide salts where the aromatic group is a phenyl group, and a typical member can be represented by the formula:

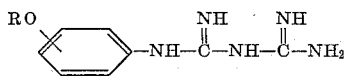

where R is an aliphatic group, the aliphatic-oxyphenyl group contains a halogen atom or if no such halogen atom is present R is a hydrocarbon substituent containing from 5 to 9 carbon atoms, and the phenyl nucleus can be further substituted. The aliphatic group R can be for example an alkyl, alkenyl, cycloalkyl or aralkyl group.

The specific class includes members where one or more hydrogen atoms in the above formula are replaced by other atoms or groups. The phenyl nucleus for example can contain a halogen atom, a nitro group, an amino group, an aliphatic group (for example one of those specified above with reference to the group R), or an aryl group; or for example a hydrogen atom in the biguanide residue can be replaced by for instance an aliphatic or aromatic group.

Salts of the aromatic biguanides that can be employed include the acid addition salts formed by treating the free biguanide with an inorganic acid such as hydrochloric or sulphuric acid, or with an organic acid such as acetic, oxalic or picric acid. Also suitable are the quaternary ammonium salts such as the quaternary halides formed by treating the free base with for example an alkyl halide.

High mycobacteriostatic activity is shown by biguanides of the above formula (and their salts) where the aliphatic group R is an alkyl group containing from 5 to 9 carbon atoms, arranged in either a straight or branched chain, and where the group RO— is located in the p-position relative to the position of attachment of the biguanide residue to the phenyl nucleus. The group RO— can however also be in the o- or m-position. Particularly effective are the p,n-alkoxyphenyl biguanides and their salts, where the alkoxy group contains from 5 to 8 carbon atoms inclusive, for example p,n-amyloxyphenyl biguanide and its hydrochloride, p,n-hexyloxyphenyl biguanide and its sulphate, p,n-heptyloxyphenyl biguanide and its hydrochloride, and p,n-octyloxyphenyl biguanide and its oxalate.

High activity is also shown by halogen-substituted compounds of the above formula, including those where R contains either more or less than 5 to 9 carbon atoms. Chloro and bromo compounds are both suitable, and a halogen atom can be present in the phenyl group or, less preferably, in the aliphatic group R. The preferred compounds of this class are those in which R is a straight chain group and contains from 2 to 8 carbon atoms, for example 3-chloro-4-n-heptyloxyphenyl biguanide, 3-chloro-4-n-amyloxyphenyl biguanide, 3-chloro-4-ethoxyphenyl biguanide, 2,5-dichloro-4-ethoxyphenyl biguanide, 2,5-dibromo-4-ethoxyphenyl biguanide, 4-(2'-chloroethoxy)phenyl biguanide and their hydrochlorides, hydrobromides, sulphates and salts of organic acids.

New chemical compounds are the aromatic biguanides of the above formula and their salts in which (a) either the aliphatic-oxyphenyl group contains a halogen atom, or if no such halogen atom is present R if an n-alkyl group contains from 5 to 7 carbon atoms and if not an n-alkyl group is a hydrocarbon substituent containing from 5 to 9 carbon atoms, and (b) the phenyl nucleus can be further substituted.

Specific examples of the new compounds of the invention are: p,n-hexyloxyphenyl biguanide and its hydrochloride; p,n-heptyloxyphenyl biguanide and its hydrochloride; m,n-heptyloxyphenyl biguanide and its sulphate; the halogen-containing compounds specifically mentioned above; p-(2-ethylhexyloxy)phenyl biguanide and its hydrochloride; 2-methyl-4(2'-ethyl-n-hexyloxy)phenyl biguanide and its oxalate.

Mycobacteriostatic compositions of the invention that are suspensions can if desired be simple ones of the aromatic biguanide or its salt in an aqueous medium; alternatively the aromatic biguanide or its salt can be dissolved in a suitable organic solvent such as for instance a hydrocarbon, a halohydrocarbon, or an animal, vegetable or mineral oil, and before use this solution can be emulsified in an aqueous medium to give an emulsion of the invention. In any instance, an emulsion can if necessary be stabilised by a suitable surface active agent.

Compositions which are solids can for instance be those in which the inert diluent is a finely-divided powder such as for instance talc.

The proportions of the mycobacteriostat employed in the compositions will of course vary according to the nature of the composition and the intended use. In general it is desirable to incorporate at least 1% by weight, but much larger amounts, for instance 10%, 25% or even 50% can be used, particularly if, as is commonly the case, the composition is a concentrated one intended to be diluted before use.

The mycobacteriostatic compositions of the invention can be employed in any way which makes use of their mycobacteriostatic properties, for instance in the protection of a variety of materials, including cloth, leather and agricultural products, against attack by bacteria and fungi, as well as for the purpose of imparting a mycobacteriostatic activity to substantially inert substances, including soaps, waxes and synthetic plastics.

The invention also includes a process for the production of a new aromatic biguanide, or biguanide salt, according to the invention, in which an appropriate aromatic amine is reacted with dicyandiamide.

The reaction between the aromatic amine and the dicyandiamide is normally carried out in the presence of acid, for instance hydrochloric or sulphuric acid, so that the initial product is a salt of the required aromatic biguanide. Good results are obtained by conducting the process in an aqueous medium, which can optionally contain a water-miscible solvent, for example a lower alcohol. For a practical reaction rate, a reaction temperature of not less than about 50° C. is usually required, for example one within the range 50–150° C. Where the reaction medium is aqueous, a useful reaction rate can in most instances conveniently be achieved by boiling under reflux. The free biguanide can be obtained from the salt by the action of an alkali, for instance sodium or potassium hydroxide.

The invention is illustrated by the following examples.

Example 1

This example describes the production of the new compound p,n-heptyloxyphenyl biguanide and its hydrochloride.

A mixture of 17.1 grams of p,n-heptyloxyaniline, and 8.3 grams of dicyandiamide in 75 cc. of water containing 9.2 cc. of concentrated hydrochloric acid (specific gravity 1.16), was boiled under reflux for 2 hours. During this time a clear solution was obtained, from which 15.3 grams of p,n-heptyloxyphenyl biguanide hydrochloride crystallised on subsequent cooling to room temperature. The crystals were filtered, washed with ethanol and dried. The melting point of p,n-heptyloxyphenyl biguanide hydrochloride was 198–200° C.

The free biguanide was liberated from the hydrochloride by treatment with a base.

Example 2 p,n-Amyloxyphenyl biguanide hydrochloride (melting point 198–200° C.) was obtained similarly by the reaction of dicyandiamide with p,n-amyloxyaniline.

Example 3

The following compounds were obtained similarly by the reaction of dicyandiamide with the appropriate amines:

4-n-hexyloxyphenyl biguanide    Melting point, ° C.
                                148–149.
4 - (2' - ethylhexoxy)phenyl biguanide _____ Obtained as a gum.
3-chloro-4-n-heptoxyphenyl biguanide _____ 110–112.
    (softening at 103° C.)
3-chloro-4-n-amyloxyphenyl biguanide _____ 102–104.
3-chloro-4-ethoxyphenyl biguanide hydrochloride _____ 217–218.
2,5-dichloro-4-ethoxyphenyl biguanide _____ 184–185.
2,5-dibromo-4-ethoxyphenyl biguanide _____ 186–187.
4 - (2'-chloroethoxy)phenyl biguanide _____ 127–128.

Example 4

This example illustrates the mycobacteriostatic activity of p,n-hexyloxyphenyl biguanide and of the hydrochlorides of p,n-amyloxy-, p,n-heptyloxy-, and p,n-octyloxyphenyl biguanide.

The method used to demonstrate the effectiveness of a compound as a bacteriostat was as follows:

0.4 cc. of a 1% by weight solution of the alkoxyphenyl biguanide in acetone, or 0.4 cc. of a 1% by weight aqueous solution of the alkoxyphenyl biguanide hydrochloride, was mixed into 20 cc. of warm sterile nutrient-containing agar in a test tube, giving a concentration of 0.02% of the compound in the medium. The warm agar was immediately poured into a sterile petri dish, and when hard was inoculated with a culture of the test bacterium. The dish was kept at a temperature of 37° C. for 24 hours, after which time it was examined for the presence or absence of growth of the organism. In the absence of growth the test was repeated at a lower concentration of the test compound until a concentration was reached at which growth occurred. The penultimate concentration was recorded as the minimum concentration of the compound capable of inhibiting the growth of the bacterium.

The method used to demonstrate the effectiveness of a compound as a fungistat was similar, except that after inoculation of the agar with the test fungus the dish was kept at a temperature of 25° C. for 72 hours before examination.

The minimum inhibitory concentrations observed are set out in the following table, which shows in the first column the alkoxy group of the alkoxyphenyl biguanide (or its hydrochloride), in the second to sixth columns inclusive the results with a variety of bacteria, and in the seventh and eighth columns the results with two fungi.

| Alkoxy group | Salmonella typhi | Staphylococcus aureus | Bacterium coli | Bacillus subtilis | Pseudomonas pyocyanea | Aspergillus niger | Penicillium expansum |
|---|---|---|---|---|---|---|---|
| n-Amyloxy | 0.005 | 0.01 | >0.02 | 0.02 | >0.02 | >0.02 | >0.02 |
| n-Hexyloxy | 0.01 | 0.005 | 0.01 | 0.005 | 0.02 | 0.01 | 0.02 |
| n-Heptyloxy | 0.001 | 0.001 | 0.005 | 0.002 | 0.02 | 0.01 | 0.01 |
| n-Octyloxy | 0.005 | 0.002 | 0.02 | 0.02 | >0.02 | 0.02 | >0.02 |

In general the results show an effective level of activity over a wide range of organisms, particularly for the n-heptyloxy derivative.

Example 5

This example illustrates the mycobacteriostatic activity of 4-(2'-ethylhexyloxy)phenyl biguanide, 3-chloro-4-n-heptoxyphenyl biguanide, 3-chloro-4-n-amyloxyphenyl biguanide, 2,5-dichloro-4-ethoxyphenyl biguanide, 2,5-dibromo-4-ethoxyphenyl biguanide, and 4-(2'-chloroethoxy)phenyl biguanide.

The method used was the same as that used in Example 4, and the results are set out in the following table:

It can be seen that 4-n-hexyloxyphenyl biguanide is effective in preventing growth of organisms of many different types.

| Aliphaticoxy-phenyl Group | Staphylococcus aureus | Pseudomonas pyocyanea | Salmonella typhi | Bacterium coli | Penicillium expansum | Aspergillus niger | Bacillus subtilis |
|---|---|---|---|---|---|---|---|
| | Gram Positive Bacterium | Gram Negative Bacterium | Enteric Gram Negative Bacteria | | Spoilage Fungi | | Spoilage Bacterium |
| 4-(2′-ethyl-hexyl)-oxyphenol | 0.002 | >0.02 | 0.02 | 0.02 | 0.01 | 0.01 | 0.002 |
| 3-chloro-4-n-heptyloxy phenyl | 0.001 | 0.02 | 0.001 | 0.005 | >0.02 | 0.02 | 0.001 |
| 3-chloro-4-n-amyloxyphenyl | 0.005 | 0.02 | 0.005 | 0.005 | >0.02 | >0.02 | 0.005 |
| 2:5-dichloro-4-ethoxyphenyl | 0.02 | 0.02 | 0.02 | 0.02 | >0.02 | >0.02 | 0.005 |
| 2:5-dibromo-4-ethoxyphenyl | 0.02 | 0.02 | 0.01 | 0.02 | >0.02 | >0.02 | 0.01 |
| 4-(2′chloro-ethoxy) phenyl | 0.01 | >0.02 | 0.02 | >0.02 | >0.02 | >0.02 | 0.02 |

*Example 6*

This example illustrates the mycobacteriostatic activity of 4-hexyloxyphenyl biguanide against a wider range of organisms than those tested in Example 4.

The method used was similar to that described in Example 4, but with the exception that 0.4 cc. of a 5% by weight solution of 4-hexyloxyphenyl biguanide in acetone was used in making up the test solutions. The results obtained are set out below.

| Organism | | |
|---|---|---|
| Streptococcus haemolyticus | Gram Positive Bacteria | <0.005 |
| Corynebacterium pyogenes | | <0.005 |
| Haemophilus parapertussis | Gram Negative Bacterium | 0.02 |
| Aerobacter aerogenes | Enteric Gram Negative Bacterium. | 0.02 |
| Streptothrix B | Veterinary | 0.005 |
| Actinomyces dermatonomus | Actinomycetes | 0.005 |
| Erwinia carotovorua | Plant Pathogenic Bacterium. | 0.1 |
| Candida albicans | Pathogenic Yeast | 0.02 |
| Trichophyton rubrum | Skin Fungi | <0.005 |
| Trichophyton mentagrophytes | | <0.005 |
| Strachybotrys atra | Spoilage Fungi | <0.005 |
| Trichoderma viride | | <0.005 |
| Paecilomyces varioti | | <0.005 |

What is claimed is:
1. A compound selected from the group consisting of heptyloxyphenyl biguanide, chloroheptyloxyphenyl biguanide, and the hydrochloride, hydrobromide and sulfate acid addition salts of such biguanides.
2. p,n-Heptyloxyphenyl biguanide.
3. 3-chloro-4-n-heptyloxyphenyl biguanide.
4. p,n-Heptyloxyphenyl biguanide hydrochloride.

References Cited by the Examiner
UNITED STATES PATENTS

| | | |
|---|---|---|
| 2,107,712 | 2/1938 | Puetzer. |
| 2,156,193 | 4/1939 | Puetzer _____ 167—22 |
| 2,455,896 | 12/1948 | Nagy. |
| 2,498,252 | 2/1950 | Curd et al. _____ 260—565 |
| 2,622,075 | 12/1952 | Hemmi et al. ____ 260—565 X |
| 2,704,710 | 3/1955 | Sprung. |
| 2,836,539 | 5/1958 | Cutler _____ 167—53.1 |
| 2,848,481 | 8/1958 | Vercellone et al. __ 260—565 X |
| 2,863,919 | 12/1958 | Birtwell et al. _____ 260—565 |
| 2,943,016 | 6/1960 | Rosen et al. _____ 167—30 |
| 2,965,535 | 12/1960 | Birium _____ 167—30 |
| 3,059,029 | 10/1962 | Geiger et al. _____ 260—564 |

FOREIGN PATENTS 217,129  2/1942  Switzerland.

CHARLES B. PARKER, *Primary Examiner.*